(12) United States Patent
Henson et al.

(10) Patent No.: US 7,376,762 B2
(45) Date of Patent: May 20, 2008

(54) SYSTEMS AND METHODS FOR DIRECT MEMORY ACCESS

(75) Inventors: Matthew Henson, Austin, TX (US); David Cureton Baker, Austin, TX (US)

(73) Assignee: SigmaTel, Inc., Austin, TX (US)

( * ) Notice: Subject to any disclaimer, the term of this patent is extended or adjusted under 35 U.S.C. 154(b) by 263 days.

(21) Appl. No.: 11/263,227

(22) Filed: Oct. 31, 2005

(65) Prior Publication Data
US 2007/0130386 A1    Jun. 7, 2007

(51) Int. Cl.
*G06F 13/28* (2006.01)
(52) U.S. Cl. .................... 710/22; 710/23; 710/24; 710/25
(58) Field of Classification Search .......... 710/22, 710/23, 24, 25
See application file for complete search history.

(56) References Cited

U.S. PATENT DOCUMENTS

| 5,621,902 | A | 4/1997 | Cases et al. | |
|---|---|---|---|---|
| 6,199,121 | B1* | 3/2001 | Olson et al. | 710/24 |
| 6,351,780 | B1 | 2/2002 | Ecclesine | |
| 6,388,591 | B1 | 5/2002 | Ng | |
| 6,678,755 | B1* | 1/2004 | Peterson et al. | 710/24 |
| 6,842,457 | B1 | 1/2005 | Malalur | |
| 2002/0067645 | A1 | 6/2002 | Ohmori et al. | |
| 2002/0161942 | A1 | 10/2002 | Morinaga | |
| 2003/0056037 | A1* | 3/2003 | Rogers | 710/22 |
| 2005/0120150 | A1 | 6/2005 | Lissel et al. | |
| 2006/0129710 | A1* | 6/2006 | O'Connor et al. | 710/36 |

FOREIGN PATENT DOCUMENTS

| EP | 0530543 A1 | 3/1993 |
|---|---|---|
| GB | 2362002 A | 11/2001 |
| JP | 2005-242411 | 8/2005 |

* cited by examiner

*Primary Examiner*—Alford Kindred
(74) *Attorney, Agent, or Firm*—Toler Law Group

(57) ABSTRACT

A system and method for providing direct memory access is disclosed. In a particular embodiment, a direct memory access module is disclosed that includes a memory, a first interface coupled to a processor, and a second interface coupled to a peripheral module. A first instruction received from the first interface is stored in the memory. The first instruction includes a number of programmed input/output words to be provided to the peripheral module via the second interface. The direct memory access module also includes an instruction execution unit to process the first instruction.

25 Claims, 4 Drawing Sheets

SYSTEMS AND METHODS FOR DIRECT MEMORY ACCESS

FIELD OF THE DISCLOSURE

The present disclosure is generally related to direct memory access systems and methods.

BACKGROUND

Computer processors are often used in conjunction with peripheral modules. These peripheral modules can perform dedicated tasks, allowing the processor to perform other tasks. The processor can oversee the operation of the peripheral modules. Further, in some situations the peripheral module can require access to a memory. Providing access to memory can be managed by the processor, but this requires undesirable overhead and use of processor time. Accordingly, some systems incorporate direct memory access modules to allow a peripheral module to access a memory directly. While direct memory access modules reduce processor overhead, the management of the direct memory access module by the processor still requires some processor time that could be used advantageously for other tasks.

Accordingly, there is a need for an improved method and system of providing direct memory access.

DETAILED DESCRIPTION OF THE DRAWINGS

A system and method for providing direct memory access is disclosed. In a particular embodiment, a direct memory access module is disclosed that includes a memory, a first interface coupled to a processor, and a second interface coupled to a peripheral module. A first instruction received from the first interface is stored in the memory. The first instruction includes a number of programmed input/output words to be provided to the peripheral module via the second interface. The direct memory access module also includes an instruction execution unit to process the first instruction. In a particular embodiment, the first instruction is part of a chain of instructions.

An integrated circuit is disclosed. The integrated circuit includes a processor, a first bus coupled to the processor and a direct memory access module coupled to the first bus. The direct memory access module includes a memory including a first instruction stored in the memory. The first instruction includes a plurality of programmed input/output (PIO) words associated with at least one device external to the integrated circuit. The integrated circuit also includes an instruction execution unit within the direct memory access module to execute the first instruction.

A method of processing a memory request is disclosed and includes receiving a memory request at a direct memory access module, accessing a first instruction at the direct memory access module. The first instruction includes a plurality of programmed input/output (PIO) words. The method also includes providing instructions to a peripheral unit by sending the PIO words to the peripheral unit.

Figure 1:
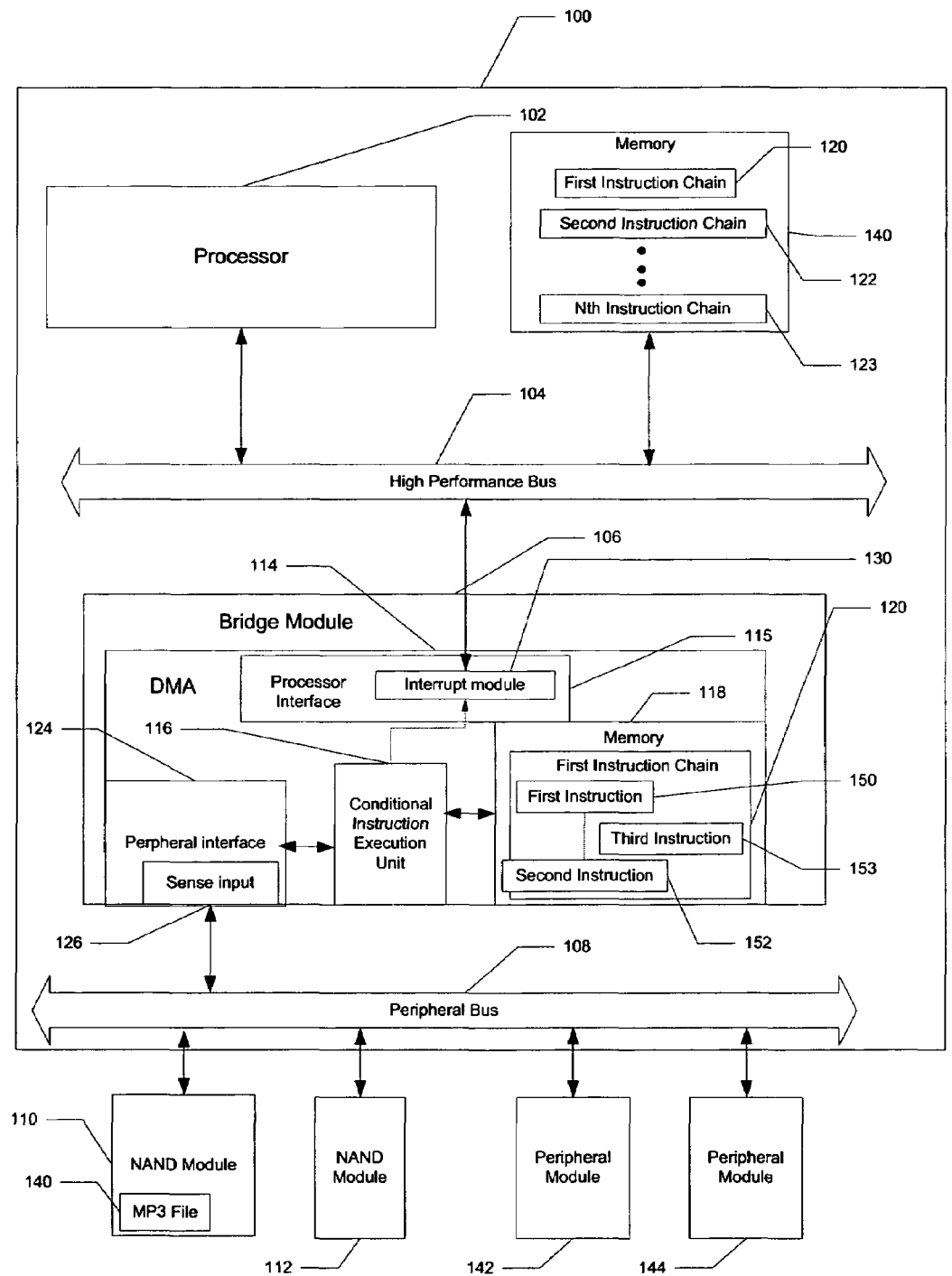
FIG. 1 is a block diagram of a particular embodiment of system incorporating a direct memory access (DMA) module.

Referring to FIG. 1, an integrated circuit 100 incorporating a direct memory access (DMA) module 114 is illustrated. The integrated circuit 100 includes a processor 102, a high performance bus 104, a bridge module 106, a memory 140 and a peripheral bus 108. The memory 140 stores a plurality of instructions, including a first instruction chain 120, a second instruction chain 122, through an Nth instruction chain 123. The integrated circuit 100 is coupled to a first NAND flash memory module 110 and a second NAND flash memory module 112. The integrated circuit 100 is also coupled to a first peripheral module 142 and a second peripheral module 144. The bridge module 106 includes a DMA module 114. The DMA module 114 includes a processor interface 115, a conditional instruction execution unit 116, a memory 118, and a peripheral interface 124. The processor interface 114 includes an interrupt module 130. The memory 118 includes the first instruction chain 120 that may be downloaded to the DMA module via the high performance bus 104. The first instruction chain 120 includes a plurality of instructions, such as a first instruction 150, second instruction 152, and a third instruction 153. The first instruction 150 may include a first number of programmed input/output (PIO) words. The second instruction 152 may include a second number of PIO words. In a particular embodiment, the first number of PIO words in the first instruction 150 is different from the second number of PIO words in the second instruction 152. The peripheral interface 124 includes a sense input 126. The NAND flash memory module 110 as shown is capable of storing a Motion Pictures Expert Group Level 3 (MP3) file 140.

The processor 102 is coupled to the high performance bus 104 and the high performance bus 104 is further coupled to the bridge module 106. The bridge module 106 is also coupled to the peripheral bus 108. The NAND flash memory modules 110 and 112 and the other illustrated peripheral modules 140 and 142 are each coupled to the peripheral bus 108. With respect to the DMA module 114, the interrupt module 130 incorporated in the processor interface 115 is coupled to the conditional instruction execution unit 116. The conditional instruction execution unit 116 is further coupled to the memory 118 and to the peripheral interface 124.

During operation, the processor 102 sends instructions to the bridge module 106 via the high performance bus 104. In a particular embodiment, the processor 102 sends instruction chains to the direct memory access module 114. These instruction chains are stored in the memory 118. These instruction chains include, for example, the illustrated first instruction chain 120. In a particular embodiment, the first instruction chain 120 includes a plurality of instructions stored in a linked list format. The conditional instruction execution unit 116 is able to process the first instruction chain 120. In response to completion of at least a subset of the instructions of the first instruction chain 120, the conditional instruction execution 116 can send a command to the interrupt module 130. In response, the interrupt module 130 can transmit an interrupt signal to the processor 102 via the high performance bus 104. In response to this interrupt signal, the processor 102 may send another chain of instructions, such as the second instruction chain 122, to the DMA module 114.

The first chain of instructions 120 is comprised of a plurality of instructions, such as the first instruction 150 and the second instruction 152. The first instruction 150 may include a plurality of programmed input/output (PIO) words. The PIO words can be provided to the NAND flash memory modules 110 and 112 or to the peripheral modules 142 and 144 to provide instructions to the modules. In a particular embodiment, a first of the PIO words can be provided to a base address of the peripheral module 142. The PIO words are provided to sequential memory addresses of the peripheral module 142 starting at the base address, such as a zero address.

In a particular embodiment, the first instruction 150 may include a command field. This command field may be executed by the conditional execution unit 116. The first instruction may also include a data field. The data field may include data to be transferred to a peripheral module, such as NAND flash memory module 110, or may include PIO words to provide instructions to a peripheral module. The first instruction may also include a pointer field. The pointer field may point to another instruction, such as second instruction 152. In a particular embodiment, the second instruction 152 may include a second pointer field. The second pointer field may point to a third instruction (not shown). In this fashion, the first instruction chain 120 may store a number of instructions in a linked list format.

The peripheral interface 124 includes a sense input 126 that may be activated by one or more of the peripheral modules 110, 112, 140 and 142. In response to a signal received at the sense input 126, the conditional instruction execution unit 116 can execute a different instruction in a chain. For example, in response to negation of the sense input 126, the conditional instruction unit 116 may process the second instruction 152, while in response to assertion of the sense input 126, the conditional instruction unit 116 may process the third instruction 153.

By executing the instruction chains at the conditional execution unit 116, the DMA module 114 can reduce the number of interrupts that are serviced by the processor 102. The number of interrupts can be further reduced by providing a series of PIO words with each of the instructions 150 and 152. The DMA module 114 can respond to a memory request from the peripheral module 110, process that request, send further instructions to the peripheral module 110 by providing a series of PIO words, and perform other tasks embodied in the first instruction chain, before sending an interrupt to the processor 102.

Further, by placing the DMA module 114 within the bridge module 106, the primary bus used for management of the peripheral modules 110 and 112 is the peripheral bus 108. This allows the high performance bus 104 to be used for other tasks by the processor 102.

In a particular embodiment, the DMA module 114 is a multichannel DMA module and can communicate with different peripherals through different channels. For example the DMA module 114 can communicate with the NAND flash memory module 110 through a first channel and can communicate with the NAND flash memory module 112 through a second channel. In a particular embodiment, the DMA module 114 may communicate with the NAND flash memory modules 110 and 112 and the peripheral modules 140 and 142 in a round-robin fashion. In a particular embodiment, the first instruction chain may include a lock field. When the lock field is asserted, the DMA module 114 may communicate only through one channel. For example, if a NAND lock field is set in the first instruction chain 120, the DMA module, during a lock time period may communicate with only a single NAND flash device, such as NAND flash memory module 110 through a first channel. After the lock field is deasserted, the lock time period is ended and the DMA module may communicate with any peripheral through its respective channel. In a particular embodiment, after the lock timer period is ended, the DMA module communicates with more than one of the first set of peripherals. In a particular embodiment, the lock time period is ended after execution of a wait for ready command. By using the lock field, a particular NAND flash device may be accessed by the DMA more frequently, allowing the DMA and NAND flash module to execute operations that are high priority or time intensive.

Figure 2:
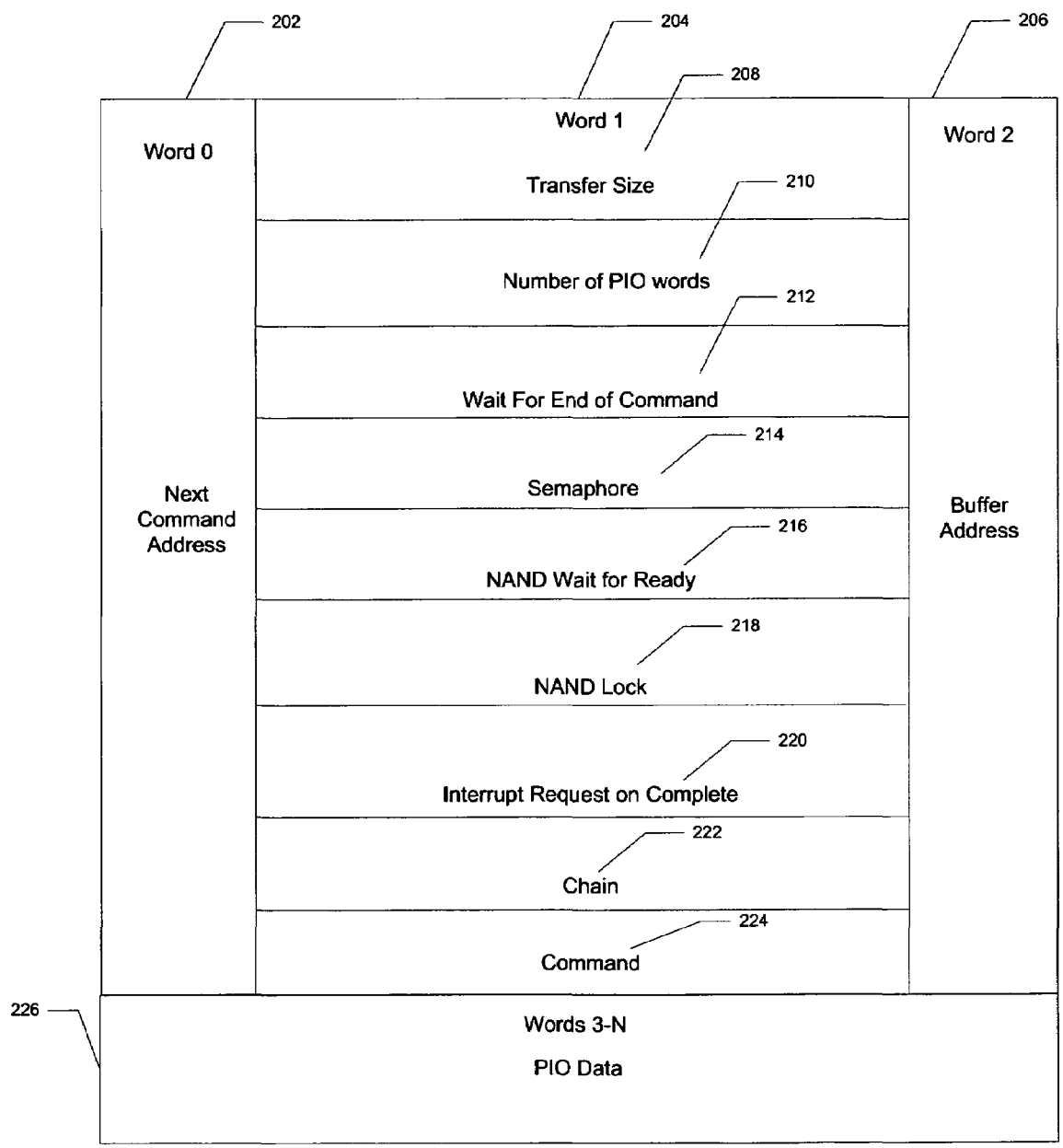
FIG. 2 is a block diagram of a particular embodiment of a data structure to be used in a direct memory access (DMA) module.

Referring to FIG. 2, a data structure for an instruction incorporated into a chain of direct memory access instructions is illustrated. The data instruction includes a plurality of words, including word 0 (202), word 1 (204) and word 2 (206). The data instruction further includes words 3-N (226). Word 1 includes a number of fields including a transfer size field 208, a number of programmed input/output (PIO) words field 210, and a wait for end of command field 212. Word 1 also includes a semaphore field 204, a NAND wait for ready field 216, a NAND lock field 218 and an interrupt request on complete field 220. Word 1 also includes a chain field 222 and a command field 224. In a particular embodiment, word 0 includes a pointer address to a next instruction. In another particular embodiment, word 2 includes a buffer address field and words 3-N include a variable number of PIO data words. This PIO data 226 may be provided to peripheral modules to provide instructions to those modules.

During operation, an instruction unit may access and process the data structure illustrated in FIG. 2. Word 1 includes a number of fields which may be read by an instruction execution unit. Based on the values of each field, the instruction execution unit may execute a particular instruction. For example, the wait for end of command field 212 can be read by the instruction execution unit. If the wait for end of command field is set at a predetermined value (such as a logic "1"), the DMA module waits until a peripheral module indicates it has completed an operation before the DMA module processes the next instruction. As another example, if the interrupt request on complete field 220 is set at a predetermined value, the instruction execution unit instructs the DMA module to send an interrupt request to a processor upon completion of the command. If the chain field 222 is set to a predetermined value, the instruction execution unit of the DMA module branches to another chain of instructions in response to receipt of a signal from a peripheral module. Particular instructions to be executed by the instruction execution unit can include a read instruction, a write instruction, a no-transfer instruction, or a branching instruction.

In a particular embodiment, the transfer size field 208 may be used to indicate the size of memory transfer to be effected by a particular instruction. The number of PIO words field 210 may be used to identify the number of programmed input/output (PIO) words 226 that are included with the instruction. This allows the DMA module to process instructions of variable length. In another particular embodiment, the wait for end of command field 212 may be asserted to instruct the DMA module to wait until a command has been completed before the DMA module executes further instructions.

In a particular embodiment, the semaphore field 214 may be read by the DMA module. The semaphore field 214 may indicate that further instructions have been added to the end of the instruction chain.

In a particular embodiment, the NAND wait for ready field 216 may be asserted to instruct the DMA module not to enact further operations with a particular NAND flash memory module until that NAND flash memory module has indicated it is ready for further operations.

In another particular embodiment, the NAND lock field may be asserted to instruct the DMA module to communicate only with a particular NAND module. The DMA module may be permitted to communicate with other sets of peripherals, but may be forbidden from communicating with peripheral modules in the same peripheral set as the particular NAND flash memory module for which the NAND lock field is asserted.

The chain field 222 may be used to indicate to the DMA module that the current instruction is followed by another instruction in the chain, or may be used to indicate that the next instruction is located in another instruction chain. The command field 224 may be used to provide further commands to the DMA module, such as a branching command.

Figure 3:
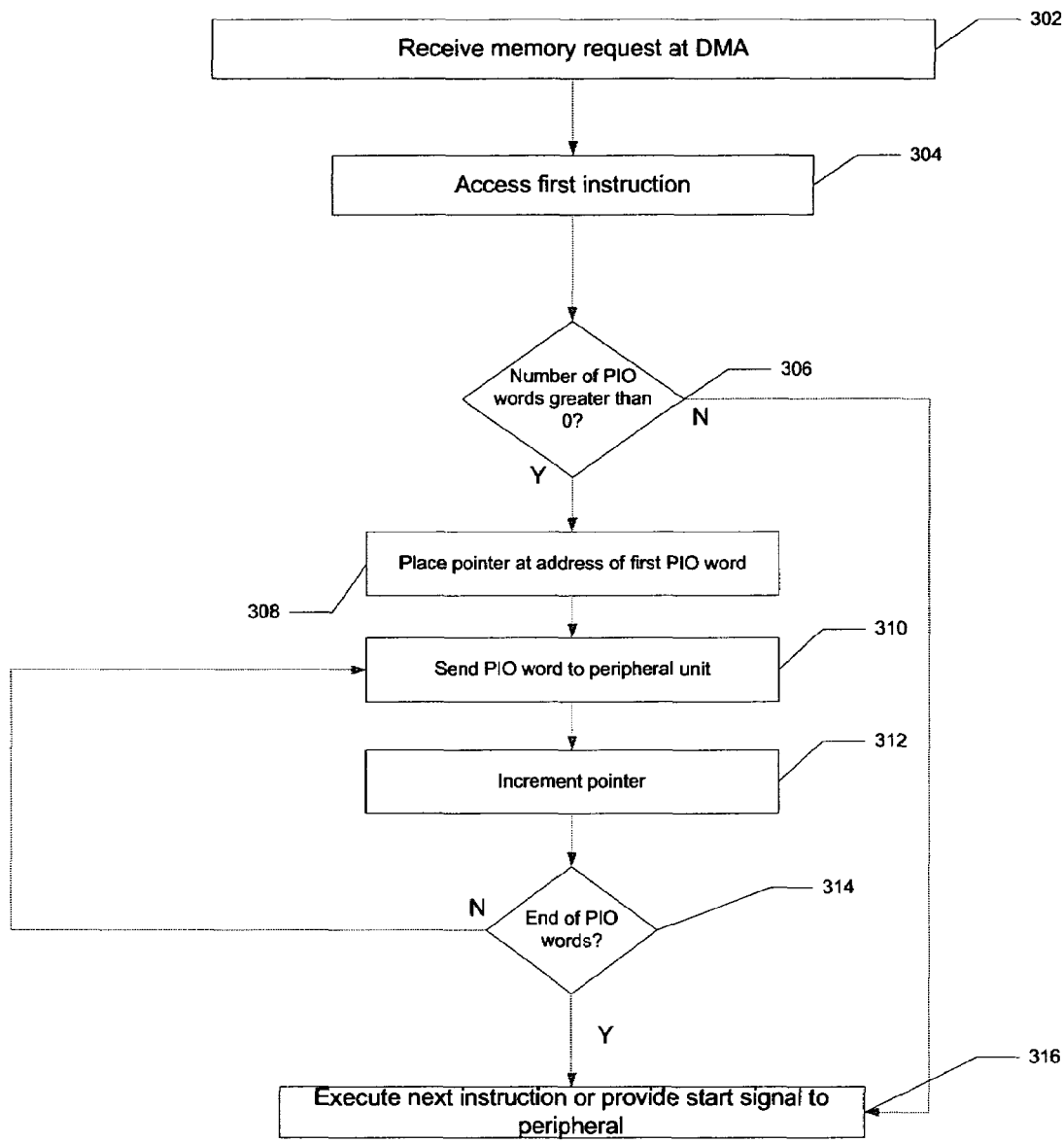
FIG. 3 is a flow chart that illustrates a method of processing an instruction at a direct memory access module.

Referring to FIG. 3, a method of processing an instruction at a DMA module is illustrated. At step 302 a memory request is received at the DMA module. Moving to step 304, a first instruction is accessed and, at decision step 306, it is determined whether the instruction includes a number of PIO words. If there are no PIO words included in the instruction the method moves to step 316, and the next instruction is executed or signal is provided to a peripheral unit to begin processing the PIO words. If there are PIO words included in the instruction, the method proceeds to step 308 and a pointer is placed at the address of the first PIO word. Moving to step 310, the current PIO word indicated by the pointer is sent to a peripheral unit. Proceeding to step 312, the pointer is incremented. At decision step 314, it is determined whether the pointer is at the end of the available PIO words. If the pointer is at the end of the available PIO words, the method moves to step 316. If the pointer is not at the end of the available PIO words, the method returns to step 310 and continues until each of the PIO words is sent to the peripheral unit.

Figure 4:
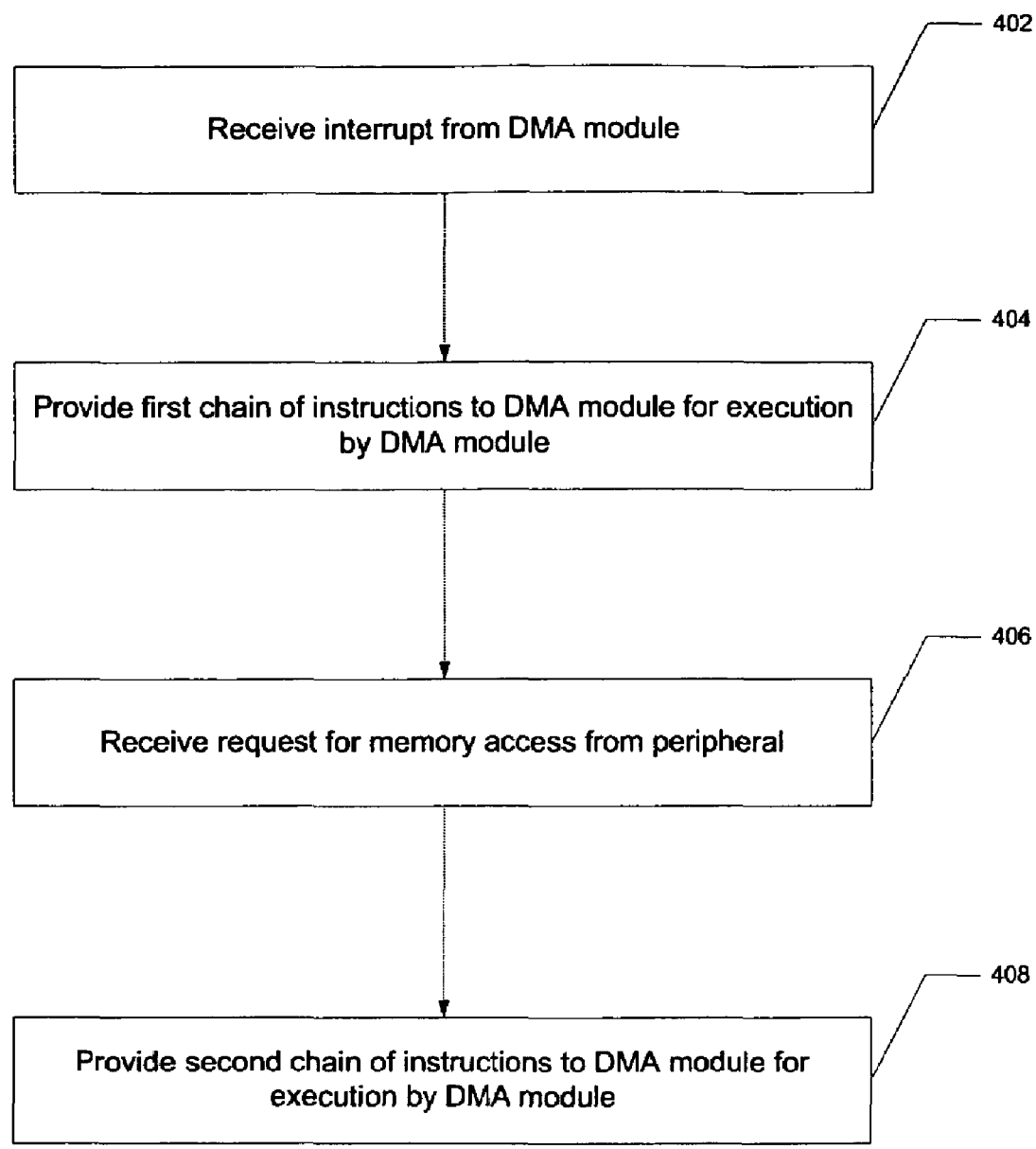
FIG. 4 is a flow chart that illustrates a method of providing a chain of instructions to a direct memory access module.

Referring to FIG. 4, a method of providing instruction chains to a DMA module is illustrated. The method may be executed by the processor 102. At step 402, an interrupt is received from a DMA module. Moving to step 404, a first chain of instructions is provided to a DMA module for execution by the DMA module. At step 406, a request is received for memory access by a peripheral. Proceeding to step 408, a second chain of instructions is provided to the DMA module for execution by the DMA module. The second chain of instructions may be provided in response to an interrupt received from the DMA module, where the interrupt is generated in response to the peripheral memory access.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A direct memory access module comprising:
    a first interface coupled to a processor;
    a second interface adapted to couple to a first peripheral module and to a second peripheral module;
    an instruction execution unit to process a first instruction and a second instruction received from the processor via the first interface, the first instruction including a first number of words to provide instructions to the first peripheral module via the second interface, the second instruction including a second number of words to provide instructions to the first peripheral module via the second interface, wherein the first number of words and the second number of words are different;
    wherein the direct memory access module communicates with the first peripheral module through a first channel via the second interface and with the second peripheral module through a second channel via the second interface; and
    wherein the direct memory access module communicates only through the first channel during a lock time period in response to assertion of a lock field in the first instruction.

2. The direct memory access module of claim 1, wherein the first instruction is one of a chain of instructions.

3. The direct memory access module of claim 1, wherein the first instruction includes a plurality of fields, at least one of the plurality of fields indicating the first number of words associated with the first instruction.

4. The direct memory access module of claim 1, wherein the instruction execution unit is a conditional execution unit.

5. The direct memory access module of claim 1, further comprising:
    a sense input; and
    a chain of instructions stored in a memory, wherein the chain of instructions includes the first instruction and the second instruction and a third instruction and wherein the second instruction or the third instruction is selectively executed based on the sense input.

6. The direct memory access module of claim 1, wherein the first instruction includes a command field, a first pointer field, and a data field.

7. The direct memory access module of claim 6, wherein the first pointer field points to the second instruction, the second instruction includes a second pointer field, and the second pointer field points to a third instruction.

8. The direct memory access module of claim 6, wherein the first instruction includes an interrupt request field.

9. The direct memory access module of claim 6, wherein the first instruction includes a direct memory access (DMA) wait field.

10. The direct memory access module of claim 6, wherein the first instruction includes a chain field.

11. The direct memory access module of claim 1, wherein the first instruction is selected from the group of a read instruction, a write instruction, a no-transfer instruction, or a branching instruction.

12. The direct memory access module of claim 1, wherein the first number of words are provided to the first peripheral module at sequential memory addresses of the first peripheral module.

13. The direct memory access module of claim 12, wherein a first of the first number of words is provided to the first peripheral module at a base address.

14. An integrated circuit, comprising:
    a processor;
    a first bus coupled to the processor;
    a second bus adapted to couple to a first peripheral device and a second peripheral device;
    a direct memory access module coupled to the first bus and to the second bus, the direct memory access module including:

an instruction execution unit within the direct memory access module to execute a first instruction and a second instruction received from the processor via the first bus, the first instruction including a first number of words to provide instructions to the first peripheral device, the second instruction including a second number of words to provide instructions to the first peripheral device, wherein the first number of words and the second number of words are different;

wherein the direct memory access module communicates with the first peripheral device through a first channel and with the second peripheral device through a second channel; and wherein the direct memory access module communicates only through the first channel during a lock time period in response to assertion of a lock field in the first instruction.

15. The integrated circuit of claim 14, further comprising:
a bridge module coupled to the first bus and to the second bus, wherein the direct memory access module is embedded in the bridge module.

16. The integrated circuit of claim 14, wherein the first instruction is one of a chain of instructions stored in a linked list data structure.

17. The integrated circuit of claim 14, wherein the first peripheral device stores MPEG-1 Audio Layer 3 (MP3) files.

18. The integrated circuit of claim 14, wherein the direct memory access module includes an interrupt module to generate an interrupt signal to the processor in response to the instruction execution unit completing a first chain of instructions.

19. The integrated circuit of claim 14, wherein the direct memory access module communicates with the second peripheral device after the lock time period is ended.

20. The integrated circuit of claim 14, wherein the lock time period ends after execution of a wait for ready command.

21. The integrated circuit of claim 14, wherein the first peripheral device and the second peripheral device comprise NAND flash memory modules.

22. A method of processing a memory request, the method comprising:

receiving a memory request at a direct memory access module;

accessing a first instruction at the direct memory access module, the first instruction including a first plurality of words and a lock field;

providing a first set of instructions to a first peripheral unit by sending the first plurality of words to the peripheral unit, wherein the direct memory access module communicates with the first peripheral unit through a first channel and the direct memory access module communicates with a second peripheral unit through a second channel;

communicating only through the first channel and not the second channel during a lock time period in response to assertion of the lock field in the first instruction;

accessing a second instruction at the direct memory access module, the second instruction including a second plurality of words, wherein the first plurality of words and the second plurality of words are different; and providing a second set of instructions to the first peripheral unit by sending the second plurality of words to the first peripheral unit.

23. The method of claim 22, further comprising:
accessing the first instruction to determine a number of the first plurality of words.

24. The method of claim 23, further comprising:
providing a signal to the first peripheral unit to process the first set of instructions after sending the first plurality of words to the first peripheral unit.

25. The method of claim 22, wherein the first instruction includes a pointer field, and further comprising storing a memory address associated with a chain of instructions at the pointer field.

* * * * *